United States Patent [19]

Workman, Sr.

[11] 4,250,352
[45] Feb. 10, 1981

[54] REMOTE STATION MONITORING SYSTEM

[76] Inventor: William S. Workman, Sr., P.O. Box 464, Sentinel, Okla. 73664

[21] Appl. No.: 37,695

[22] Filed: May 10, 1979

[51] Int. Cl.³ .................................... H04M 11/04
[52] U.S. Cl. .............................. 179/2 A; 179/5 R
[58] Field of Search .......... 179/2 R, 2 A, 5 R, 5 P, 179/2 AM, 1 MN

[56] References Cited

U.S. PATENT DOCUMENTS

| | | | |
|---|---|---|---|
| 3,612,768 | 10/1971 | Sherman | 179/2 A |
| 3,809,813 | 5/1974 | Brown | 179/5 R |
| 3,891,802 | 6/1975 | Bartelink | 179/2 A |

*Primary Examiner*—Bernard Konick
*Assistant Examiner*—Joseph A. Popek
*Attorney, Agent, or Firm*—Dunlap, Codding & McCarthy

[57] ABSTRACT

A system for monitoring the operating condition of one or more reporting devices, which incorporates a telephone network connecting a remote terminal and a monitor terminal. A control circuit is provided in which one or more monitor relays are interposed, each monitor relay opening independently in response to a change in operating condition of a reporting device. When a monitor relay opens, current flow is interrupted to a return signal control relay, which thereby short-circuits the subscriber loop to the remote terminal, so that a busy signal is returned in response to calls from the monitor terminal. When all monitor relays are closed, indicating all reporting devices to be in normal condition, the return signal control relay is energized, opening the short circuit in the subscriber loop. Accordingly, a ringing signal is returned in response to calls to the remote terminal.

16 Claims, 5 Drawing Figures

REMOTE STATION MONITORING SYSTEM

FIELD OF THE INVENTION

The present invention relates generally to systems for monitoring the operational condition of one or more pieces of equipment, and more particularly, but not by way of limitation, to equipment monitoring systems incorporating telephone communication networks.

BACKGROUND OF THE INVENTION

With advances in automation technology, it has become possible for many types of mechanical and electrical equipment to function without continuous observation and supervision by operating personnel. This development has been put to advantageous use in situations where equipment, such as that utilized in a pumping station, must be located in a remote, unpopulated area. In these instances, equipment automation at the remote site eliminates the substantial manpower and transportation costs which would be entailed in maintaining an on-site staff for attending the equipment.

Because unattended automated equipment may experience unexpected operational failure, some system for notifying service personnel of a failure is generally a necessity for most unattended systems. Without such a notification system, the equipment could be inoperative for lengthy periods of time before the malfunction comes to the attention of service personnel. Such notification systems have most frequently made use of pre-existing telephone networks, which offer a relatively inexpensive communication medium adaptable to equipment monitoring purposes.

Known in the art are systems in which equipment at a remote station is connected to a telephone network, so that the equipment may be monitored by telephoning the remote station. The ringing voltage received at the telephone terminal at the remote station actuates means for answering the call at the remote station, and thereafter the system causes a signal to be sent to the caller over the line, indicating the status of the equipment being monitored. Timer means may be provided at the remote station for terminating the telephone connection after a predetermined period has elapsed, so that the remote station may be re-called at a later time, without the need to maintain constant telephone contact with the remote station. Representative patents embodying systems of this type include: U.S. Pat. No. 1,765,598, issued to McCoy, et al.; U.S. Pat. No. 2,326,200, issued to Bristol; U.S. Pat. No. 3,347,987, issued to Chaloupka; U.S. Pat. No. 3,029,642, issued to Burhans, et al.; U.S. Pat. No. 3,989,898, issued to Dugan, et al.; and U.S. Pat. No. 4,016,360, issued to Cane. Also known are similar systems in which a telephone caller to a telephone terminal at the remote station may hear sounds produced adjacent the telephone set via the microphone in the terminal's handpiece. Representative patents embodying this type of system include U.S. Pat. No. 2,898,405, issued to Eck, and U.S. Pat. No. 3,038,965, issued to Civitano.

Prior art equipment monitoring systems have generally required both a means for creating an open telephone connection between a monitoring station and a remote station, and a means for terminating the connection upon the completion of information transmission between the remote and monitor stations. These requirements have been met by providing equipment for answering all incoming calls at the remote station, so that an open line may be formed, and for terminating the telephone connection after a predetermined time has elapsed, once information transmission over the open line is complete. The answering and timer equipment required in prior art equipment monitoring systems has contributed significantly to the cost of purchase, operation and maintenance of these systems.

While substantial amounts of information may be transmitted over the open telephone connection established in prior art monitoring systems, transmission of large amounts of information is not required in many types of equipment monitoring applications. For example, it may be necessary for monitoring personnel to know only whether equipment at a remote site is in proper operating condition, so that it may be determined whether to make a service call. In such a case, specific information as to the causes of operational failure, if any, need not be transmitted, since this information will ordinarily be obtained at the time of the equipment service call, if such a call is required. Because the only information required is whether or not the equipment is operational, most of the information-transmitting capability of prior art equipment monitoring systems would be wasted in such an application.

The small amounts of information which must be transmitted in many monitoring applications have not thus far been met with a less costly equipment monitoring system, in part because of the need for answering and timing equipment in all current systems. A need therefore exists for an equipment monitoring system in which an open telephone line between the remote and monitor stations is not required, so that the costly answering and timing equipment of prior art systems may be eliminated.

SUMMARY OF THE INVENTION

The present invention provides a remote monitoring system in which monitor subsystems, comprising one or more monitor relays interposed in a control circuit, originate alarm signals in response to changes in operating conditions in one or more reporting devices. Alarm signals are transmitted via the control circuit to a return signal control subsystem, comprising a return signal control relay.

A telecommunication system, preferably a telephone network, connects a monitor terminal to a remote terminal, such that a status inquiry signal may be directed from the monitor terminal to the remote terminal, and a return signal, having either a first or second mode, may thereafter be returned to the monitor terminal. The return signal relay is connected to the telecommunication system so that the return signal is maintained in its second mode when alarm signals are being generated and is maintained in its first mode when alarm signals are not being generated. Accordingly, by observing the return signal mode received in response to a status inquiry signal, it may be determined whether alarm signals are being generated, and thus whether or not reporting devices have experienced changes in operating condition.

It is an object of the present invention to provide a system which may incorporate pre-existing telecommunication systems for purposes of monitoring operation of reporting devices, such as pieces of electrical and mechanical equipment at a remote station.

It is another object of the present invention to provide a remote station monitoring system in which monitoring of reporting devices is accomplished at minimal cost, without equipment having information-handling capacity in excess of monitoring needs.

Another object of the present invention is to provide a remote station monitoring system incorporating a telecommunication network which does not require status inquiry signals to a remote terminal to be answered, and which does not require timing equipment for terminating calls so answered.

It is another object of the present invention to provide a remote station monitoring system in which the two modes of return signal transmitted by a telephone network, in response to a status inquiry signal directed to a remote terminal from a monitor terminal, provide the medium for communicating information regarding the operating condition of reporting devices.

Other objects, features and advantages of the invention will be evident from the following detailed description when read in conjunction with the accompanying drawings, which illustrate the preferred embodiments of the invention, and the appended claims.

DESCRIPTION OF THE PREFERRED EMBODIMENT

Figure 1:
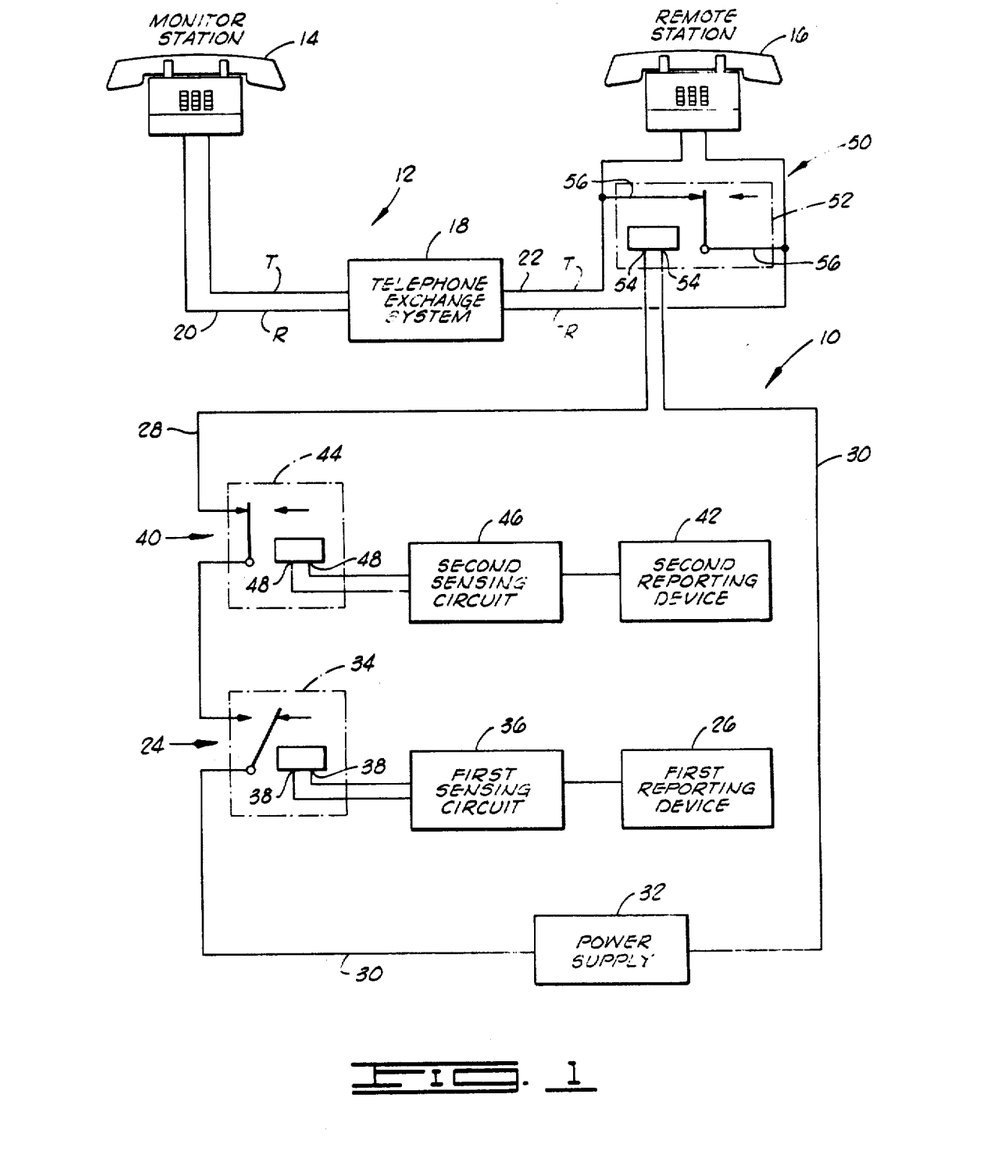
FIG. 1 is a schematic diagram depicting the remote station monitoring system of the present invention.

With reference to FIG. 1, the remote station monitoring system of the present invention, generally designated by the reference numeral 10, comprises a telecommunication system such as a telephone network 12, for signal transmission between a station at which automated devices are located (hereinafter referred to as a remote station) and a station at which personnel oversee the operation of such automated devices (hereinafter referred to as a monitor station). The design and construction of telephone networks is well known in the prior art, and will be discussed only insofar as it relates to the pertinent features of the present invention.

Comprising the telephone network 12 is a monitor terminal 14 located at the monitor station, and a remote terminal 16 located at the remote station. For ordinary remote monitoring applications, the monitor and remote terminals 14 and 16 may comprise conventional telephone sets, as shown in FIG. 1. However, it will be understood that other types of telephonic signal transmission and reception terminals may be employed in the system of the present invention, if required.

The telephone set comprising the monitor terminal 14 is connected to a telephone exchange system 18 by a first subscriber loop 20, comprising a tip line T and a ring line R. The connection of the tip line T and ring line R to the monitor terminal 14 is conventional in the telephone art, and will not be described herein. In like manner, the telephone set comprising the remote terminal 16 is connected to the telephone exchange system 18 by a second subscriber loop 22, also comprising a tip line T and a ring line R.

The telephone sets comprising the monitor and remote terminals 14 and 16 each incorporate a switch hook (not shown) for signaling the telephone exchange system 18 when a call is originated or terminated. When the switch hook is in an off-hook status, the tip line T and ring line R are conductively connected at the telephone set, while when the switch hook is in an on-hook status, the tip line T and ring line R are disconnected.

The telephone exchange system 18 comprises the switching equipment, central office equipment, and transmission lines necessary to effect telephonic connection of the monitor terminal 14 and the remote terminal 16. Included in the telephone exchange system 18 is a means for transmitting a status inquiry signal from the monitor terminal 14 to the remote terminal 16. The status inquiry signal is preferably that produced by dialing of the telephone number of the remote terminal 16 at the monitor terminal 14. Also included in the telephone exchange system is a means for transmitting a return signal to the monitor terminal 14, in response to a status inquiry signal. In the event that the remote terminal 16 is in on-hook status, the return signal will be a ringing signal (also referred to as a first mode return signal), and in the event that the remote terminal 16 is in off-hook status, the return signal will be a busy signal (also referred to as a second mode return signal).

With continued reference to FIG. 1, the remote station monitoring system 10 further comprises a first monitor subsystem 24 for generating an alarm signal in response to a change in operating condition of a first reporting device 26. The first monitor subsystem 24 comprises a control circuit 28, comprising a conductor loop 30 connected to a power supply 32. The control circuit 28 is connected across the contacts of a first monitor relay 34, which comprises a normally open relay. When the control circuit 28 is otherwise closed, opening of the first monitor relay 34 causes interruption of current flow in the control circuit 28. This current flow interruption comprises the previously mentioned alarm signal, and its role in the system of the present invention will be discussed in greater detail hereafter.

Further comprising the first monitor subsystem 24 is a first sensing circuit 36, shown schematically in FIG. 1, which is connected at the power terminals 38 to the coil of the first monitor relay 34. The first sensing circuit 36 selectively causes current to flow to the coil of the first monitor relay 34 in response to the operating condition of the first reporting device 26, also shown schematically in FIG. 1. The first sensing circuit 36 may be powered by the power supply 32, by the first reporting device 26, or by any other power source appropriate to the particular monitoring application. When the first monitor relay 34 is energized by the first sensing circuit 36, the control circuit 28 is completed, and when the first monitor relay 34 is de-energized by the first sensing circuit 36, the control circuit 28 is broken.

As an example of one type of first monitor subsystem, a remote station at which pumping operations are conducted may be considered. In such an operation, the first reporting device 26 might comprise an automatically operated booster for pumping water from a storage reservoir to customer hookups. In such a case, the first sensing circuit 36 would comprise a first conductor connecting the electrical circuit between the disconnect and the magnetic starter of the booster pump motor to one power terminal 38 of the first monitor relay 34, and a second conductor connecting the second power terminal 38 of the first monitor relay 34 to an AC line. When the booster pump motor is operational, current will flow in the circuit between the disconnect and the magnetic starter, and thus through the first sensing circuit 36. This current flow will cause energization of the coil of the first monitor relay 34, and completion of the control circuit 28. When the motor is not operational, current flow between the fuse and magnetic starter, and thus through the first sensing circuit 36, is interrupted. This results in deenergization of the first monitor relay 34, causing interruption of the control circuit 28.

With continued reference to FIG. 1, the remote station monitoring system 10 further comprises a second monitor subsystem 40, for generating an alarm signal in response to a change in condition of a second reporting device 42. The second monitor subsystem 40 comprises a second monitor relay 44, comprising a normally closed relay. The control circuit 28 is connected across the contacts of the second monitor relay 44. When the control circuit 28 is otherwise closed, opening of the second monitor relay 44 causes interruption of current flow in the control circuit 28. This current flow interruption constitutes an alarm signal, the function of which will be described in greater detail hereafter.

Further comprising the second monitor subsystem 40 is a second sensing circuit 46, shown schematically in FIG. 1, which is connected to the power terminals 48 of the second monitor relay 44, and which causes energization of the coil of the second monitor relay 44 in response to the operating condition of the second reporting device 42. The second sensing circuit 46 may be powered by the power supply 32, by the second reporting device 42, or by any other power source appropriate in a particular monitoring application. When the second monitor relay 44 is energized by the second sensing circuit 46, the control circuit 28 is interrupted, and when the second monitor relay 44 is deenergized by the second sensing circuit 46, the control circuit 28 is completed.

In relation to the previously mentioned example of a remote station at which water pumping operations are conducted, the second reporting device 42 in such an operation might comprise an automatic well pump for furnishing underground water to a storage reservoir. The second sensing circuit 46 in such a case would comprise a conductor connected to a circuit in the well pump powering a disagreement or alarm light. This conductor is connected across the power terminals 48 of the coil of the second monitor relay 44 to an AC line. When the disagreement light is lit, indicating a well pump disorder, current flows in the second sensing circuit 46, causing energization of the second monitor relay 44. When the second monitor relay 44 is thus energized, the control circuit 28 is broken by the second monitor relay 44.

With continued consideration to the example of the remote station pumping operations, the second reporting device 42 might alternatively comprises a pressure switch for monitoring water line pressure at a water storage reservoir or at a booster pump station. The second sensing circuit 46 in such a case would comprise a circuit powered by an AC source and connected serially across the pressure switch and the coil of the second monitor relay 44. When the line pressure reaches a predetermined value, the pressure switch is closed, causing energization of the second monitor relay 44, and breaking of the control circuit 28.

The control circuit 28, as just described, is connected serially across the contacts of the first monitor relay 34, and the second monitor relay 44. However, it will be understood that, if monitoring of additional reporting devices is required, the control circuit 28 may be connected across additional monitor relays, situated in series with the first and second monitor relays 34 and 44. Each such additional monitor relay is powered by a sensing circuit independently responsive to the operating condition of a reporting device, in a manner identical to that described with respect to the first and second monitor relays 34 and 44 and the first and second sensing circuits 36 and 46. It will be further understood that, if monitoring of only a single reporting device is required, then the control circuit 28 need be connected across only a selected one of the first and second monitor relays 34 and 44. Thus, in general, the control circuit 28 is serially connected across a number of monitor relays equal to the number of reporting devices sought to be independently monitored by the system of the present invention.

While the first monitor relay 34 has been shown and described as a normally open relay, and while the second monitor relay 44 has been shown and described as a normally closed relay, it will be understood that this has been for purposes of example only. The control circuit 28 may be connected across a set of normally open relays, a set of normally closed relays, or a set combining normally open and normally closed relays. Selection of the type of relay to be used in conjunction with a particular reporting device will be dictated by the response of the sensing circuit to the reporting device. If current flow in the sensing circuit is interrupted upon change in operating condition in the reporting device, a normally open relay is provided in the control circuit 28. If current flow in the sensing circuit is initiated upon a change in operating condition in the reporting device, a normally closed relay is provided in the control circuit 28.

Further comprising the remote station monitoring system 10 is a return signal control subsystem 50 associated with the second subscriber loop 22. The return signal control subsystem 50 maintains the return signal, which is transmitted in response to a call placed to the remote terminal 16, in a selected state as long as an alarm signal is generated by the first or second monitor subsystems 34 or 44. In the embodiment shown in FIG 1, the return signal subsystem 50 comprises a return signal control relay 52, constituting a relay of the normally closed type. The return signal control relay 52 will be referred to as having a first, or open state and a second, or closed state. The coil of the return signal control relay 52 is connected at the power terminals 54 to the control circuit 28. The respective contacts of the return signal control relay 52 are connected by conductors 56 to the ring line R and tip line T of the second subscriber loop 22. The connections between the second subscriber loop 22 are made at a point in the the subscriber loop 22 intermediate to the remote terminal 16 and the telephone exchange system 18.

With continued reference to FIG. 1, the control circuit 28, when closed, maintains the coil of the return signal control relay 52 in an energized state. Because the contacts of the relay 52 are open when the coil is energized, short-circuiting of the ring line R to the tip line T in the second subscriber loop 22 is prevented, so that the telephone exchange system 18 registers the remote terminal 16 as being in an on-hook status. Consequently, when the control circuit 28 is closed, a call placed to the remote terminal 16 from the monitor terminal 14 will result in transmission of a ringing return signal to the monitor terminal 14.

When the first relay 34 or second relay 44 is opened, in response to a change in operating condition in either reporting device 26 or 42, an alarm signal constituting an interruption of current flow in the control circuit 28 is transmitted to the return signal control relay 52. The current interruption causes deenergization of the normally closed return signal control relay 52, resulting in a short circuit between the ring line R and tip line T of the second subscriber loop 22. For purposes of the system of the present invention, the creation of this short circuit is functionally equivalent to placing the remote terminal 16 in off-hook status, and the remote terminal 16 is so registered at the telephone exchange system 18. Consequently, when the control circuit 28 is open, a call placed from the monitor terminal 14 to the remote terminal 16 will result in transmission of a busy return signal to the monitor terminal 14.

It will be understood that, if desired, the return signal control relay 52 may constitute a normally open relay rather than a normally closed relay. In this event, a busy signal will be transmitted to the monitor terminal 14 when all reporting devices are in normal condition, and a ringing signal will be transmitted upon a change in operating condition of one or more reporting devices.

From the foregoing description, it will be understood that when all reporting devices monitored by the system of the present invention are in normal operating condition, then all monitor relays connected in the control circuit 28 will be closed, so that the return signal control relay 52 will be energized. This energized or first state of the return signal control relay 52 maintains the remote terminal 16 in on-hook status, so that a ringing signal is received at the monitor terminal 14 when the remote terminal 16 is called.

Upon a change in operating condition in a reporting device, a monitor relay responsive to that device via a sensing circuit will open in the control circuit 28, resulting in de-energization of the return signal control relay 52. In its second or de-energized state, the return signal control relay 52 causes short-circuiting of the ring line R to the tip line T in the second subscriber loop 22, so that a busy signal is received when the remote terminal 16 is called.

It will be noted that more than one reporting device may be monitored in the present system by virtue of the serial disposition of monitor relays in the control circuit 28. This capability derives from the fact that the alarm signal controlling the return signal mode is in interruption of current flow in the control circuit 28. Because of this, any one of the monitor relays, by opening the control circuit 28, may initiate the alarm signal for altering the mode of the return signal from a ringing signal to a busy signal. The alarm signal will continue to be generated as long as any one, or more than one, monitor relay is open. It will be recognized, however, that return of a busy signal to the monitor station 14 indicates only that one or more of the reporting devices being monitored have experienced a change in operating condition. More specific information as to the identity of the reporting device or devices can be obtained only by a visit to the remote station.

In the event that a reporting device experiences a change in operating condition which cannot be corrected immediately by repair personnel, it may be desirable to temporarily adapt the remote station monitoring system to monitor the operating condition of reporting devices other than the malfunctioning device. This may be accomplished by providing for each monitor relay a side circuit (not shown) connected to the control circuit 28 so as to bypass the monitor relay, and a toggle switch interposed in each such side circuit. When a monitor relay is open, due to a malfunctioning reporting device, the control circuit 28 may be closed again by closing the toggle switch in the side circuit around the monitor relay corresponding to the malfunctioning device. When the toggle switch is thus closed, a ringing return signal will be returned in response to a status inquiry signal until a second reporting device experiences a change in operating condition. When the malfunctioning device is repaired, monitoring of the device's operating condition may be resumed by throwing the toggle switch so as to break the side circuit.

In considering the system shown in FIG. 1, it will be noted that, in the event that a change in operating condition in a reporting device corrects itself, the monitor relay responsive to that reporting device will re-close. If all other reporting devices are in normal status, then reclosing will result in re-energization of the return signal control relay 52, so that a ringing signal is once again returned to the monitor station 14. Thus, in the system shown in FIG. 1, a temporary malfunction in a reporting device will not be known to a caller from a monitor station 14 unless the call comes during the duration of the malfunction, when a busy signal is transmitted.

Figure 2:
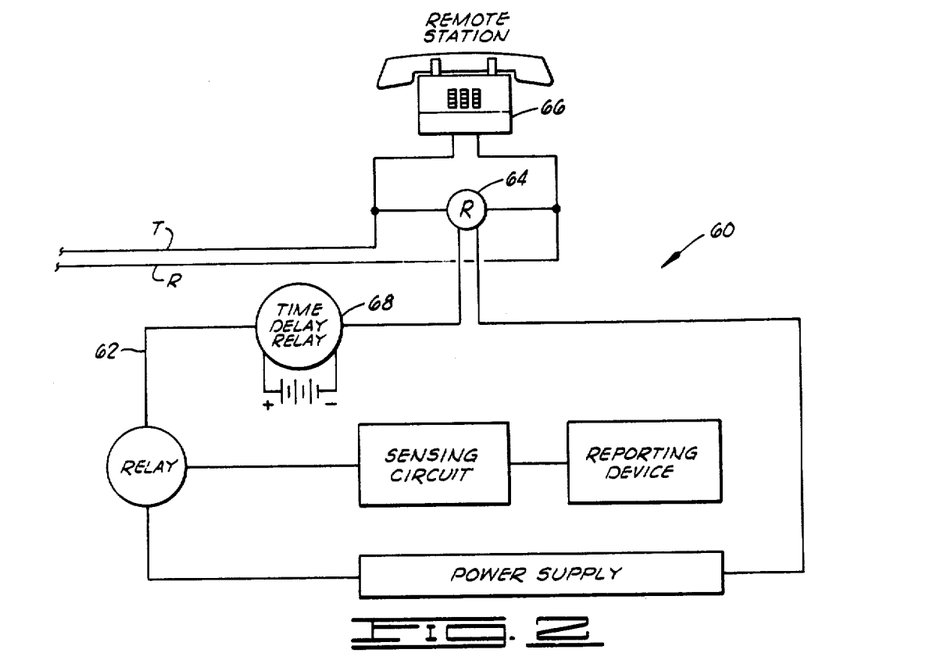
FIG. 2 is a schematic diagram of another embodiment of the remote station monitoring system of the present invention. The monitor terminal, telephone exchange system and connecting lines have not been shown.

Knowledge that a self-corrected malfunction in a reporting device has occurred is not needed in many types of monitoring applications, so that the system shown in FIG. 1 is completely satisfactory. However, in some remote monitoring applications, temporary malfunctions, such as power losses, may present significant operational hazards to reporting devices even if these malfunctions are self-corrected. In FIG. 2, there is shown a modified system in which means are provided for reporting temporary as well as extended changes in reporting device operating conditions.

Shown in FIG. 2 is a remote station monitoring system, generally designated by the reference numeral 60, having a control circuit 62 which powers a normally closed return signal control relay 64. The return signal control relay 64 functions to control the return signal received from a call to the remote terminal 66, in a manner identical to that of the return signal control relay 52 discussed previously. The control circuit 62 is connected across one or more serially connected monitor relays, in a manner identical to that of the system discussed with reference to FIG. 1. Each such monitor relay is responsive, via a sensing circuit, to the operating condition of a reporting device.

From the previous discussion with reference to the system shown in FIG. 1, it will be understood that interruption of current flow in the control circuit 62, shown in FIG. 2, results in return of a busy signal to a monitor terminal when a call is placed to the remote terminal 66. Current interruption is caused by opening of the monitor relays connected into the control circuit 62, which is in turn caused by changes in operating conditions of one or more reporting devices.

The control circuit 62 is additionally connected, in serial relation to the monitor relays, to a time delay relay 68, which is powered by a DC power source. The time delay relay 68 is a normally closed relay which opens after a predetermined time period has elapsed. A suitable time delay relay for purposes of the present system is the CHD38-30013 Solid State/EMR time delay relay, manufactured by Potter & Brumfield, Princeton, Indiana 47671.

The time delay relay 68 responds to an interruption in current flow in the control circuit 62. If the duration of this interruption exceeds a predetermined time limit, the time delay relay 68 is de-energized, and opens the control circuit 62. After the time delay relay 68 is de-energized, current flow in the control circuit 62 cannot resume, regardless of the condition of the reporting devices controlling the monitor relays. Thus, it will be understood that unless the operating condition of a reporting device corrects itself within the predetermined time limit, then the time delay relay will maintain the control circuit 62 in open status. Accordingly, after the time limit has elapsed, a busy signal will be returned to calls to the remote terminal 66, regardless of whether the condition of the reporting device thereafter corrects itself. The time delay relay can be closed again in this event only by the action of service personnel at the remote station.

Figure 3:
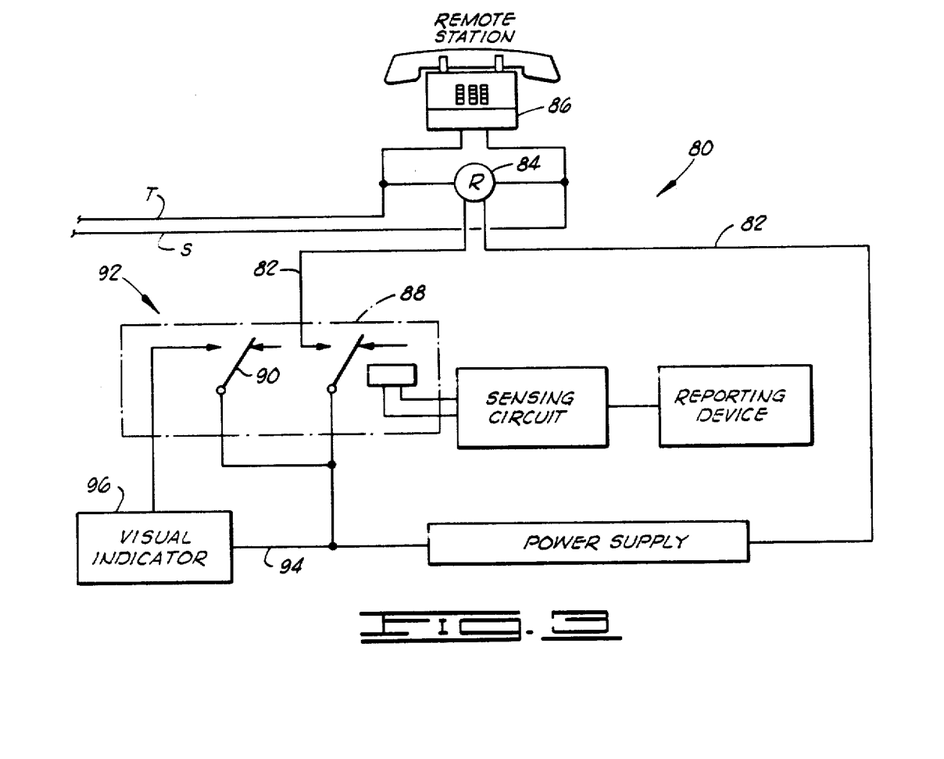
FIG. 3 is a schematic diagram of yet another embodiment of the remote station monitoring system of the present invention. The monitor terminal, telephone exchange system and connecting lines have not been shown.

Shown in FIG. 3 is another embodiment of the remote station monitoring system of the present invention, generally designated by the reference numeral 80. Comprising the system is a control circuit 82, connected to a power supply, for selectively powering a return signal control relay 84, which controls the mode of the return signal transmitted in response to a call placed to the remote terminal 86. The control circuit 82 is connected serially across the contacts of a monitor relay 88, which is responsive, via a sensing circuit, to the operating condition of a reporting device. The operation of the system as thus far described is identical to that previously discussed with reference to the system shown in FIG. 1.

In the system shown in FIG. 3, the monitor relay 88 comprises, in addition to the contacts with the control circuit 82, an additional set of contacts for a display switch 90, which controls a display system 92. The contacts of the normally open display switch 90 are connected to a conductor loop 94 which is connected to a power supply, shown in FIG. 3 as the same power supply used for the control circuit 82. The conductor loop 94 is connected across the power terminals of a visual indicator 96, such as a pilot lamp.

When the monitor relay 88 is open, in response to a change in the operating condition of a reporting device, the display switch 90 will be closed, thereby connecting the visual indicator 96 to the power supply via the conductor loop 94, and thus energizing the visual indicator 96. Thus, when a service call is made to the remote station, in response to reception of a busy signal from the remote terminal 86, the visual indicator 96 may be used to identify which of possibly many reporting devices has experienced a change in operating condition. It will be understood, however, that each reporting device must be associated with its own unique visual indicator, in order to allow correct identification of the malfunctioning reporting device. Thus, for example, each reporting device might carry a pilot lamp functioning as a visual indicator, so that service personnel may quickly deduce the source of any malfunction as being that device or devices with lighted pilot lamps.

In the display system 92 just described, the visual indicator 96 is de-energized once a malfunctioning reporting device returns to normal. If, however, it is desired to maintain a visual indicator in energized state dispite the normalization of the reporting device, this may be accomplished by modification of the system shown in FIG. 3 by conventional electrical techniques which are well known to those skilled in the art, and which will accordingly not be described herein.

In some instances it may not be possible to electrically short circuit the ring line R and tip line T in the second subscriber loop 22, as in FIG. 1, in order to cause a busy signal to be returned in response to a call to the remote terminal 16. The system shown in FIG. 4 avoids the necessity of such electrical short-circuiting by providing a means for mechanically opening and closing the switch hook of the remote terminal in response to changes in operating condition of a reporting device. This mechanism permits the return signal to change between a busy mode and a ringing mode in response to operating condition changes, as in the system described with reference to FIG. 1.

Figure 4:
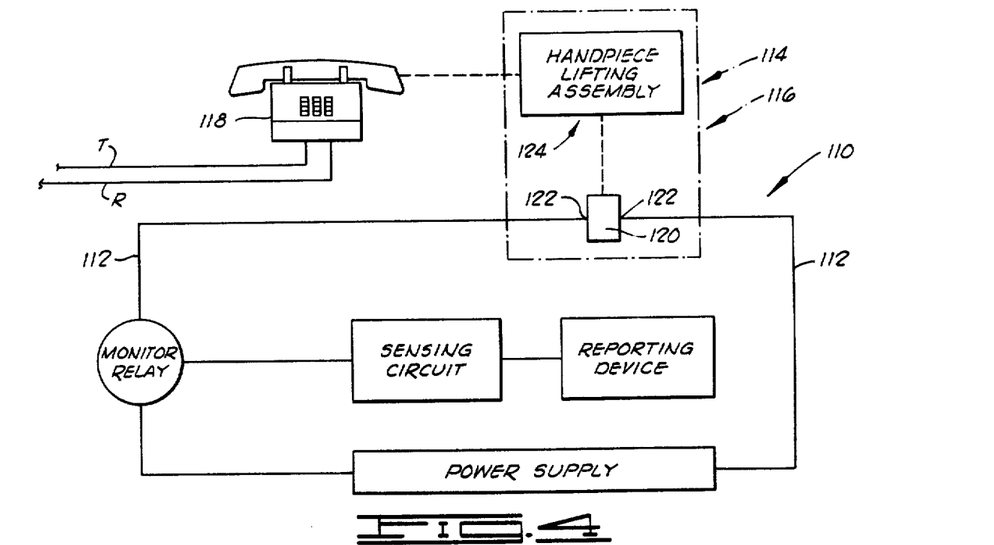
FIG. 4 is a schematic diagram of one other embodiment of the remote station monitoring system of the present invention. The monitor terminal, telephone exchange system and connecting lines have not been shown.

With reference to FIG. 4, this embodiment of the remote station monitoring system, generally designated by the reference numeral 110, comprises a control circuit 112 serially connected across one or more monitor relays, as in the system described with reference to FIG. 1. Each monitor relay is independently responsive, via a sensing circuit, to the operating condition of a reporting device. When a change in condition occurs in one or more reporting devices, current flow is interrupted in the control circuit 112 by opening of the corresponding monitor relay or relays interposed therein. Current flow is not resumed in the control circuit 112 until all monitor relays are closed, indicating all reporting devices to be in normal condition. The control circuit 112 is connected to a return signal control subsystem 114, which comprises a switch hook actuator assembly 116, shown schematically in FIG. 4. The switch hook actuator assembly 116 functions to alter the switch hook status of the remote terminal 118 in response to current interruptions in the control circuit 112.

Figure 5:
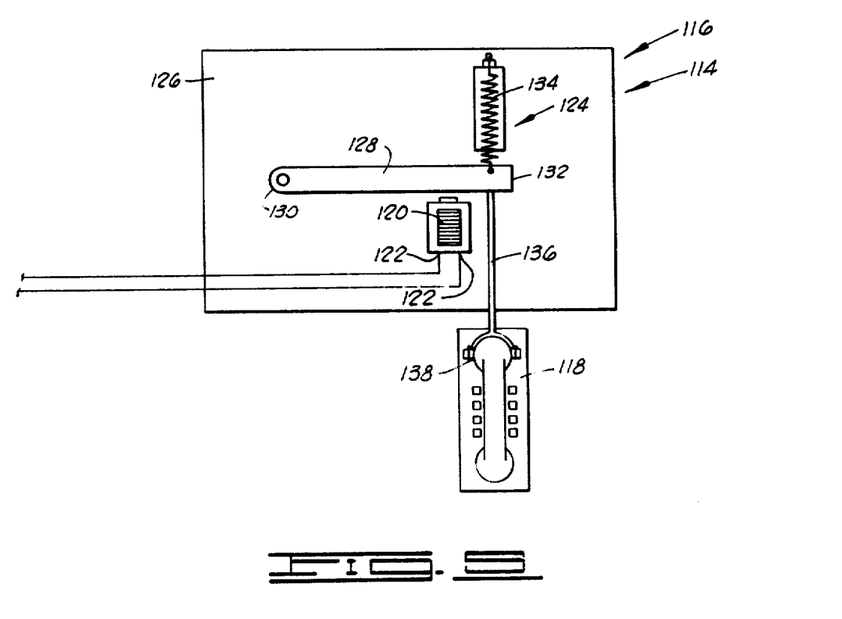
FIG. 5 is a diagrammatic view of the switch hook actuator assembly of the remote station monitoring system shown schematically in FIG. 4.

With reference to FIG. 4, the switch hook actuator assembly 116 comprises a solenoid 120, having power terminals 122 connected to the control circuit 112. Further comprising the switch hook actuator assembly 116, as best shown in FIG. 5, is a handpiece lifting assembly 124 comprising a flat base member 126, such as a wall, on which is pivotally mounted an arm member 128 having a first end 130 and a second end 132. The arm member 128, which is formed from a magnetically active material such as iron, is pivotally connected to the base member 126 at its first end 130. At its second end 132, the arm member 128 is secured to a spring 134 which is mounted on the base member 126. The solenoid 120 is disposed adjacent the second end 132 of the arm member 128 of the hand piece lifting assembly 124, such that the magnetic field of the solenoid 120, when energized, maintains the arm member 128 in a substantially horizontal position, as shown in FIG. 5. The second end 132 of the arm member 128 is secured to a downwardly extending connection apparatus 136, such as a chain, which is secured at its lower end to the handpiece 138 of the remote terminal 118, shown in FIG. 5 as a wall-type telephone set.

The handpiece 138 of the remote terminal 118 rests in a cradle position, as shown in FIG. 5, in which the switch hook maintains the remote terminal 118 in on-hook status. When the handpiece 138 is lifted from the cradle position to a raised position (not shown) the switch hook is opened, so as to render the remote terminal 118 in off-hook status.

When the solenoid 120 is de-energized, in response to an interruption in current flow in the control circuit 112, the spring 134 causes the arm member 128 of the handpiece lifting assembly 124 to move upward, in turn causing the connection apparatus 136 to raise the handpiece 138 of the remote terminal 118. The size, positioning and spring constant of the spring 134 are selected so that the arm member 128 raises the handpiece 138 a sufficient distance to cause the switch hook to transfer the remote terminal 118 from on-hook to off-hook status. Consequently, interruption of current flow in the control circuit 112 results in transmission of a busy signal in response to calls placed to the remote terminal 118.

Unless a time delay relay is interposed in the control circuit 112, as was discussed with reference to the system shown in FIG. 2, then upon return of all reporting devices to normal operating condition, current flow will resume in the control circuit 112, causing re-energization of the solenoid 120. Upon re-energization, the magnetic field of the solenoid 120 will draw the arm member 128 to a horizontal position, and the handpiece 138 will be returned to its cradle position. Thereafter, the remote terminal 118 will be in on-hook status, so that a ringing return signal is transmitted in response to calls placed to the remote terminal 118.

From the foregoing description of the preferred embodiments of the present invention, it will be understood that systems presented herein permit remote station monitoring to be conducted in connection with the existing telephone networks, without need for equipment for answering and terminating incoming calls to the remote terminal. This has been accomplished by constituting the busy signal and ringing signal, returned in response to unanswered calls to the remote terminal, as the modes for communicating information concerning the condition of reporting devices at the remote station. The systems of the present invention thus provide an inexpensive and efficient means for carrying out many types of remote monitoring operations.

It is clear that the present invention is well adapted to carry out the objects and attain the ends and advantages mentioned as well as those inherent therein. While the presently preferred embodiments of the invention having been described for the purposes of this disclosure, numerous changes may be made which will readily suggest themselves to those skilled in the art, and which are encompassed within the spirit of the invention disclosed and as defined in the appended claims.

What is claimed is:

1. In combination with a telecommunication system establishing signal transmission between a monitor terminal and a remote terminal, wherein a status inquiry signal originating at the monitor terminal and directed to the remote terminal results in transmission to the monitor terminal of a return signal having a selected one of a first mode and a second mode, a system for monitoring the operating condition of at least one reporting device, the system comprising:

first monitor means for originating a first alarm signal for the duration of a change in operating condition of a first reporting device;

timing means connected to the first monitor means for receiving the first alarm signal and undergoing a transition to a de-energized state in response to the reception of the first alarm signal for a time period in excess of a preselected time limit; and return signal control means connected to the remote terminal for controlling the mode of the return signal, wherein the return signal control means is connected to the timing means so as to be conditioned by the state of the timing means to transmit return signals in the second mode thereof at such times that the timing means is in the de-energized state thereof.

2. The system of claim 1 in which the first monitor means comprises:

a control circuit providing an electrical current to the timing means, thereby energizing the timing means, in the absence of the first alarm signal; and a first monitor relay interposed in the control circuit for selectively interrupting current flow in the control circuit in response to a change in operating condition of a first reporting device.

3. The system of claim 2 further comprising a second monitor relay interposed in the control circuit, in serial relation to the first monitor relay, for selectively interrupting current flow in the control circuit in response to a change in operating condition of a second reporting device.

4. The system of claims 2 or 3 in which the telecommunication system comprises:

a telephone exchange system;

a first subscriber loop connecting the telephone exchange system to the monitor terminal; and a second subscriber loop connecting the telephone exchange system to the remote terminal.

5. The system of claim 4 in which one mode of the return signal is a ringing signal transmitted to the monitor terminal from the telephone exchange system, and in which the other mode of the return signal is a busy signal transmitted to the monitor terminal from the telephone exchange system.

6. The system of claim 5 in which the return signal control means comprises a return signal control relay having a first state and a second state.

7. The system of claim 6 in which the second subscriber loop comprises a ring line and a tip line connected at the remote terminal; and in which the return signal control relay, in changing from its first state to its second state, forms a short circuit between the ring line and the tip line.

8. The system of claim 7 in which the first mode return signal is a ringing signal, and in which the second mode return signal is a busy signal.

9. The system of claim 8 wherein the timing circuit is further characterized as being a time delay relay of the type which remains in the de-energized state thereof after undergoing a transition to said de-energized state.

10. The system of claim 9 further comprising:

first display means, responsive to the first relay means, for visually indicating whether a first alarm signal is being transmitted.

11. The system of claim 5 in which the remote terminal further comprises a switch hook having an on-hook position for transmitting a first mode return signal and having an off-hook position for transmitting a second mode return signal; and in which the return signal control means comprises:

switch hook actuator means for moving the switch hook between its on-hook position and its off-hook position.

12. The system of claim 11 in which a remote terminal further comprises:

a handpiece having a cradle position in which the switch hook is caused to assume its on-hook position, and having a raised position in which the switch hook is caused to assume its off-hook position;

and in which the switch hook actuator means comprises:

a solenoid powered by the control circuit; and handpiece lifting means, magnetically responsive to the solenoid, for moving the handpiece between its cradle position and its raised position.

13. The system of claim 12 in which the handpiece lifting means further comprises:

a planar base member;

an arm member, having a first end pivotally connected to the base member and a second end, with the arm member disposed such that its second end moves along a path substantially coincident with the axis of the solenoid; and connection means for securing the second end of the arm member to the handpiece.

14. The system of claim 13 in which the first mode of the return signal is a ringing signal and in which the second mode return signal is a busy signal.

15. The system of claim 14 wherein the timing circuit is further characterized as being a time delay relay of the type which remains in the de-energized state thereof after undergoing a transition to said de-energized state.

16. The system of claim 15 further comprising:

first display means, responsive to the first monitor relay means, for visually indicating whether a first alarm signal is being transmitted.

* * * * *